US006707175B2

United States Patent
Rigazzi

(10) Patent No.: US 6,707,175 B2
(45) Date of Patent: Mar. 16, 2004

(54) LINEAR GENERATOR WITH INDUCTION COIL WHICH MOVES WITH RESPECT TO FIXED PERMANENT MAGNETS

(75) Inventor: Pier Andrea Rigazzi, Agno (CH)

(73) Assignee: Dauber Holdings Inc., Panama (PA)

( * ) Notice: Subject to any disclaimer, the term of this patent is extended or adjusted under 35 U.S.C. 154(b) by 0 days.

(21) Appl. No.: 10/275,481

(22) PCT Filed: May 18, 2001

(86) PCT No.: PCT/IB01/00866

§ 371 (c)(1),
(2), (4) Date: Nov. 6, 2002

(87) PCT Pub. No.: WO01/95465

PCT Pub. Date: Dec. 13, 2001

(65) Prior Publication Data

US 2003/0106505 A1 Jun. 12, 2003

(30) Foreign Application Priority Data

Jun. 9, 2000 (CH) .......................................... 1142/2000

(51) Int. Cl.$^7$ ................................................ H02K 35/04
(52) U.S. Cl. .............................. 310/23; 310/15; 310/20; 123/46 E; 290/1 R
(58) Field of Search .......................... 310/15, 17, 20, 310/23–24; 123/46 E; 60/699; 290/1 R, 4 R

(56) References Cited

U.S. PATENT DOCUMENTS

| 3,729,691 A | * | 4/1973 | Beiswinger et al. .... 331/116 M |
| 4,532,431 A | | 7/1985 | Iliev et al. |
| 5,893,343 A | | 4/1999 | Rigazzi |

FOREIGN PATENT DOCUMENTS

| DE | 196 47 031 | 5/1997 |
| DE | 195 45 397 | 6/1997 |
| EP | 0 509 660 | 10/1992 |

* cited by examiner

*Primary Examiner*—Burton Mullins
(74) *Attorney, Agent, or Firm*—Young & Thompson

(57) ABSTRACT

A linear generator includes an induction system including coils and magnets, to which a relative motion is imparted by moving the coils or permanent magnets integrally with a piston of an internal combustion engine provided with return springs having one end facing the interior of a piston head, in which the coils are fixed on a movable bell coaxial with the cylinder, and the magnets are fixed on a second fixed bell coaxial with the first bell, the latter being made integral with the piston by a hollow shaft coaxial with the cylinder. The ends of the coils are connected to wires which pass through the cavity of the hollow shaft and reach the ends of the springs facing the interior of the head of the piston, and the other end of each spring is in contact with an output terminal for electric current flowing in the coils.

3 Claims, 1 Drawing Sheet

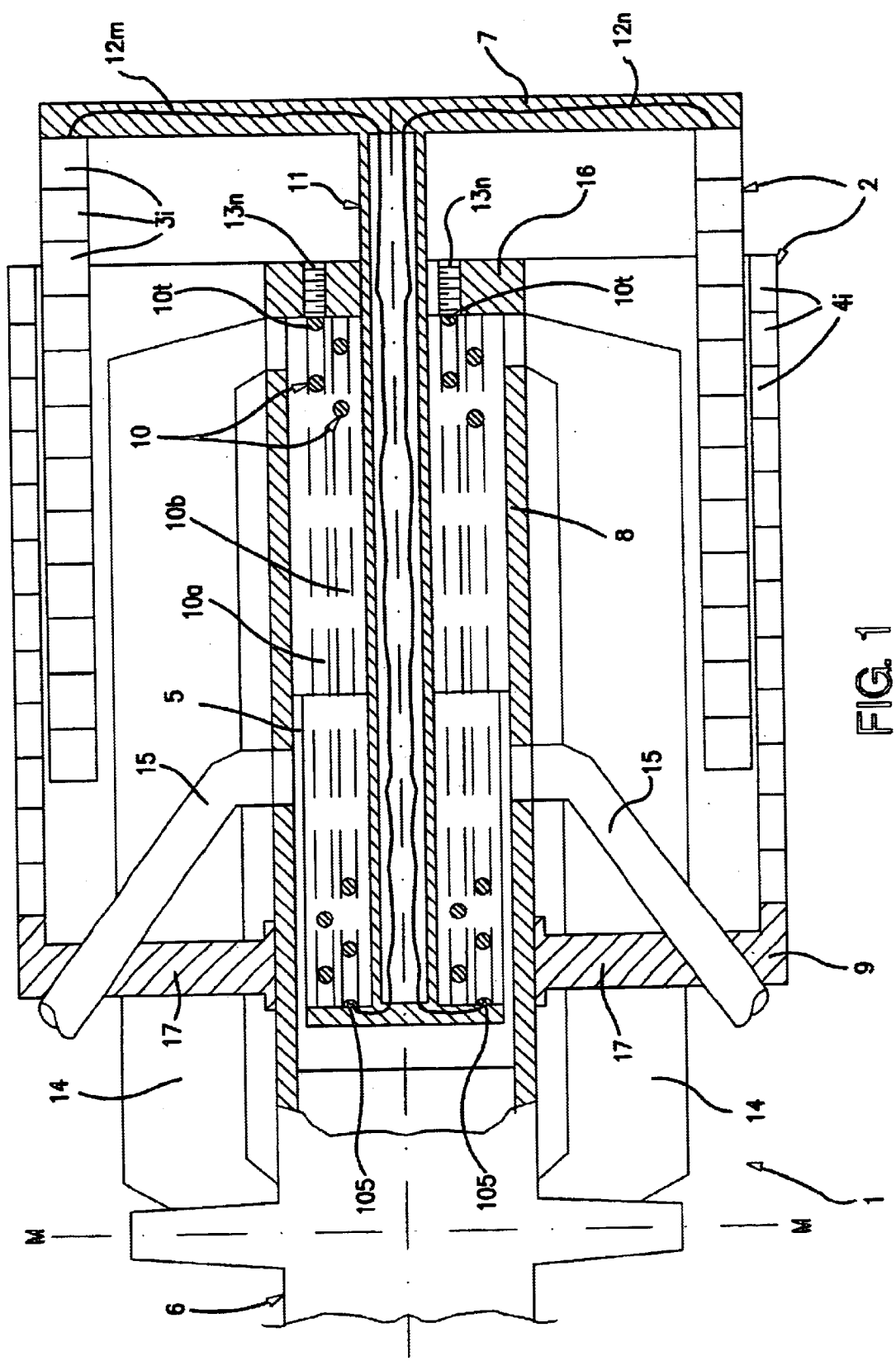

LINEAR GENERATOR WITH INDUCTION COIL WHICH MOVES WITH RESPECT TO FIXED PERMANENT MAGNETS

CROSS REFERENCE TO RELATED APPLICATION

This is the 35 USC 371 national stage of International Application PCT/IB01/00866 filed on May 18, 2001, which designated the United States of America.

FIELD OF THE INVENTION

The present invention relates to the field of linear generators of electrical current, in which the current is generated by the movement of the moving part of an induction system with respect to a fixed part thereof.

More particularly, the invention relates to the type of generator in which the pistons of the internal combustion engine are free and complete their return stroke under the action of a system of springs.

BACKGROUND OF THE INVENTION

An example of this type of generator is described in patent application PCT/EP95/02054 (Rigazzi).

In the present state of the art, the permanent magnets forming the said induction system are movable, being integral with the piston or pistons of the internal combustion part, and the coils forming the other part of the system are fixed coaxially with respect to the magnets.

However, this arrangement of the parts has the drawback that, in order to absorb the mechanical power generated by the internal combustion part, it is necessary to use a quantity of magnets having a significantly large mass, with all the disadvantages arising from the fact that it is then necessary to move this mass rapidly to produce electrical energy. As far as the inventor is aware, the use of moving coils has not even been considered as yet, because of the problem of fatigue fracture of the output wires of the coils due to their reciprocating movement.

SUMMARY OF THE INVENTION

However, the inventor of the present invention has perceived that the prerequisites for the provision of the technical arrangements required to overcome this drawback are already present in a generator of the type described above.

This is because, by a novel arrangement of the parts, in which the return springs of the pistons are used as output conductors for the current flowing in the coils, the coils can be moved without the use of moving parts which break as a result of fatigue.

This is because the aforesaid springs are designed to withstand long periods of use without being adversely affected by the stresses to which they are subjected.

Furthermore, in the generators in question, the springs operate in a region having a temperature close to the ambient temperature, and therefore they are not damaged in any way by the slight increase in their temperature caused by the current flowing through them.

The inventor has therefore made use of the elements described above to devise the solution according to the present invention, which consists of a linear generator as described in the precharacterizing clause of the attached claim 1, characterized by what is disclosed in the characterizing clause of the said claim.

A preferred embodiment of the linear generator according to the invention will now be described, with the proviso that this example is not binding or limiting with respect to other different embodiments which can be produced by a person skilled in the art on the basis of the content of the aforesaid claim 1.

BRIEF DESCRIPTION OF THE DRAWINGS

In the course of the said description, reference will also be made to the attached FIGURE, which shows a longitudinal section through the aforesaid preferred embodiment of the invention.

DETAILED DESCRIPTION OF THE INVENTION

In the aforesaid FIGURE, only the right-hand half of the linear generator 1 according to the invention is shown, with respect to the plane M-M which divides it into two parts which are mirror images of each other.

This FIGURE shows how the induction coils 3$i$ and the permanent magnets 4$i$ forming the electromagnetic induction system 2 of the generator 1 are fixed, respectively, on a first bell 7 and on a second bell 9, these bells being cylindrical and coaxial with each other and with the cylinder 8 of an internal combustion engine 6 with free opposing pistons 5 (only one of these is visible in the FIGURE).

The said first bell 7, on which the induction coils 3$i$ are fixed, is movable, being made to move integrally with the piston 5 by means of a hollow coaxial shaft 11 fixed on the inner rear part of the head of the piston 5.

On the other hand, the second bell 9, on which the permanent magnets 4$i$ are fixed, is fixed, being mounted coaxially on the cylinder 8 by connecting means, for example bars 17 as shown in the FIGURE.

The ends of the coils 3$i$ are connected to conducting wires 12$n$ (two of which are shown in the FIGURE) which, after passing through or outside the cover of the said first bell 7, pass through the cavity of the said hollow shaft 11 to reach the end 10$s$ of each of the springs 10$a$, 10$b$ (two of these also being shown in the FIGURE), the springs facing the interior of the head of the piston 5 and generating the return stroke of the piston.

The currents flowing in the coils 3$i$ therefore pass through the said springs 10$a$, 10$b$, and reach their opposite ends 10$t$ which bear on the cap 16 of the cylinder 8 through which the hollow shaft 11 slides.

This cap 16 houses the output terminals 13$n$ from which the said currents can be drawn so that they can be used for the specified purpose.

Clearly, depending on the number of phases required for the user, there can be more than two of the said conducting wires 12$n$, and a point of the said cylinder cap 16 can also be used as an earth connection for the coils 3$i$, since the whole of the internal combustion engine 6 is normally connected to earth.

In order to have a sufficient number of coils 3$i$ and magnets 4$i$, it is advantageous to use bells 7 and 9 having suitably large diameters.

This also makes it possible to house within the bells, in the space between them and the cylinder 8, both the scavenging bellows 14 required for two-stroke operation and the exhaust pipes 15 of the internal combustion engine 6 associated with the generator 1.

In the embodiment described up to this point, the said first bell 7 housing the induction coils 3$i$ is located coaxially inside the second bell 9 housing the permanent magnets 4$i$, but it is possible, if required for design reasons, to locate the second bell 9 housing the magnets 4i inside the first bell 7 housing the coils 3i.

However, the inventor suggests the solution shown in the FIGURE, in which, by specifying a suitable shape and size for the outer fixed bell 9, this bell can also be used as an enclosing and supporting casing for the whole generator 1 and the internal combustion engine 6.

All of the inventor's specified objectives are attained by means of a generator made according to the invention.

In the present description it has not been considered necessary to describe in detail the systems to be used to provide suitable insulation of all the parts in which current flows, since systems of this type are familiar to those skilled in the art.

The methods for fixing the coils and magnets to the corresponding bells are also familiar to those skilled in the art.

It is preferable to make the said bells from materials having low specific weight and high mechanical strength.

What is claimed is:

1. A linear generator including an electromagnetic induction system, comprising:

introduction coils fixed on a first movable bell connected to and moved by a reciprocating piston of an internal combustion engine by a hollow shaft which is located inside and coaxial with a hollow cylinder;

permanent magnets fixed on a second bell fixed integrally to and coaxial with said hollow cylinder;

return springs located inside the hollow cylinder and surrounding the hollow shaft; and wherein the ends of the induction coils are connected to conducting wires which pass through the hollow shaft and connect to one end of each respective spring, while the other end of each spring is connected to an output terminal.

2. The linear generator according to claim 1, wherein the first moving bell, on which the induction coils are fixed, is located coaxially inside the second fixed bell on which the permanent magnets are fixed.

3. The linear generator according to claim 1, further comprising one or more scavenging bellows, and one or more exhaust ducts located inside the first bell and the second bell.

* * * * *